United States Patent Office.

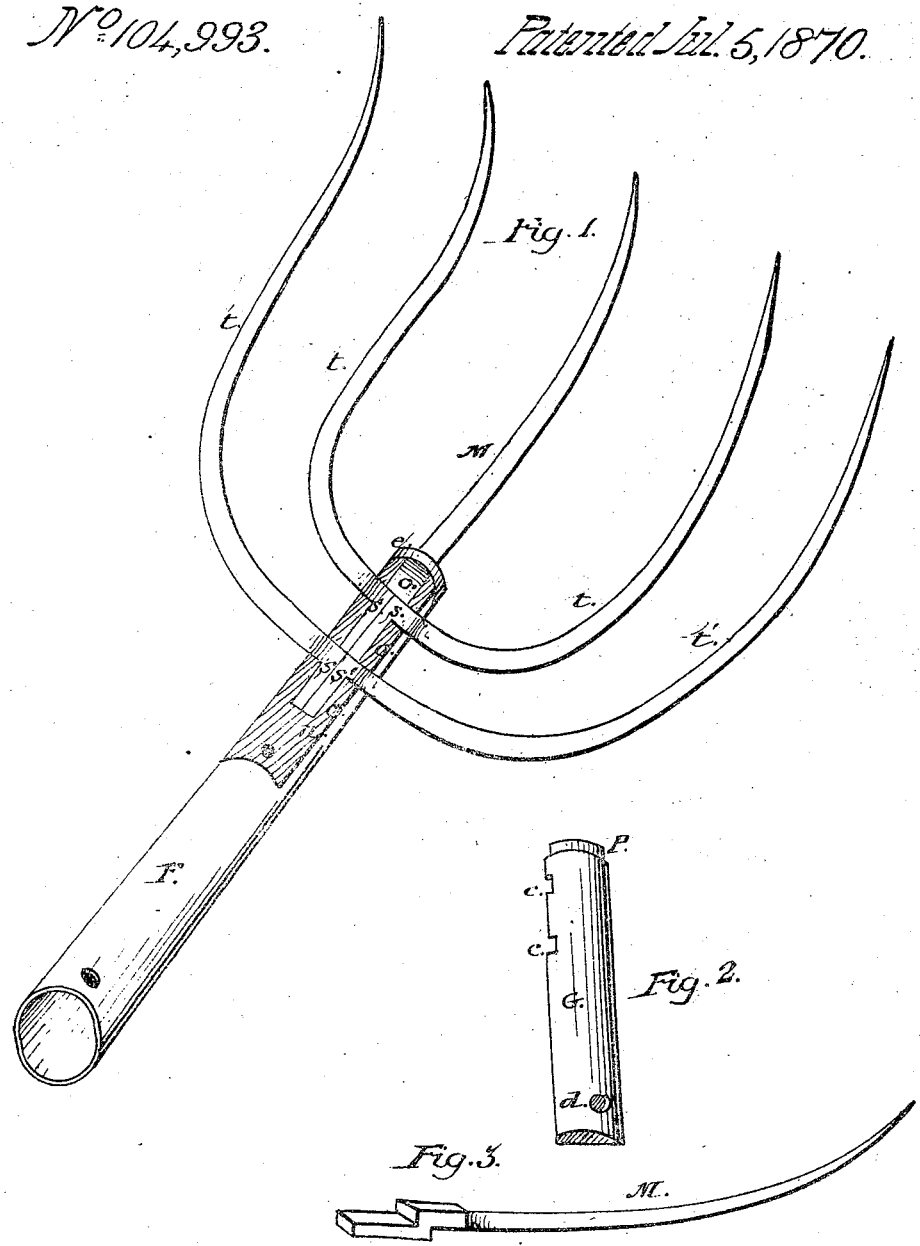

ROLLA A. PEET, OF CALEDONIA TOWNSHIP, MICHIGAN.

Letters Patent No. 104,993, dated July 5, 1870.

IMPROVEMENT IN HAY AND MANURE-FORKS.

The Schedule referred to in these Letters Patent and making part of the same

*To all whom it may concern:*

Be it known that I, ROLLA A. PEET, of the township of Caledonia, county of Kent and State of Michigan, have invented certain new and useful Improvements in Hay, Straw, and Manure-Forks; and I do hereby declare that the following is a full, clear, and exact description of my invention, reference being had to the accompanying drawing and the letters of reference marked thereon, and the same are made a part of these specifications.

Figure 1 represents a general view of my invention in perspective, with a portion of the ferrule removed, showing the arrangement of the fork-tines as they are held in their respective places ready for use;

Figure 2 is the movable portion of the ferrule; and

Figure 3 is a perspective view of the middle tine of the fork.

To enable those who are skilled in the branch of mechanics to which the manufacture of my invention belongs to make the same, I will proceed to describe its construction.

It consists in a hay, straw, or manure-fork, provided with separate and movable tines, fitted into an iron or metallic ferrule, and held firmly in their place, in the manner herein described.

In fig. 1—

Letter F represents the ferrule, cut out at *n*, and provided with the ring *e*.

The tines *t t* and *t' t'* are provided with shanks, shown in fig. 1 by the letters *s s* and *s' s'*.

The middle tine M, fig. 3, is provided with a double shoulder, as shown in the figure.

In fig. 2—

Letter G represents the movable portion of the ferrule.

The part P is so constructed as to fit under the ring *e* of the ferrule F.

This piece is held in its place by means of the ring *e* and the screw *d*.

In putting the fork together ready for use, the tine M is passed under the ring *e*, and fits into a groove provided in the ferrule F, the front portion of which is solid, with the exception of the grooves described. The tines *t t* are then applied to the ferrule, the shanks *s s* fitting into the groove directly over the part *e'* of the tine M. The tines *t' t'* are then applied to the ferrule, the shanks *s' s'* fitting into the groove. When thus placed in the ferrule, the parts *s s* and *s' s'* and *o* present a smooth surface. The part G is then applied, the part P fitting under the ring *e*, and the other end of the piece G is firmly screwed down by means of the screw *d*, thus holding all the tines firmly in their places.

The ferrules F and G are provided with grooves or slots, *c c* and *c' c'*, through which the tines pass.

The part F should be made of iron, or some suitable metal, and of sufficient strength to hold the tines firmly in their respective places.

By means of my invention, the operator can easily and quickly provide himself with a one, two, three, four, or five-tined fork, or even with one having more tines, when desired.

I deem my invention peculiarly adapted to hay, straw, and manure-forks, but it may be applied to forked garden-spades, fish-spears, or to any implement where it is desirable to have tines or prongs of various kinds or varied numbers.

Having thus described my invention,

What I claim to have invented, and desire to secure by Letters Patent, is—

1. A fork having the tines constructed as above described, and secured in the manner above set forth.

2. The combination of the part $G_1$ fig. 2, with the tines and ring *e*, when arranged and constructed substantially as described.

3. The tine M, constructed with a double shoulder, as shown, when arranged with the ring *e* and part G, fig. 2, as described.

In witness that I claim the above, I have hereunto set my hand this 18th day of April, A. D. 1870.

ROLLA A. PEET.

Witnesses:
CHAS. O. SIMONDS,
EDWARD TAGGART.